US010111193B2

(12) United States Patent
Kono

(10) Patent No.: US 10,111,193 B2
(45) Date of Patent: Oct. 23, 2018

(54) STORAGE MEDIUM, RADIO SIGNAL DEMODULATION METHOD, AND RADIO SIGNAL DEMODULATION APPARATUS

(71) Applicant: FUJITSU LIMITED, Kawasaki-shi, Kanagawa (JP)

(72) Inventor: Taki Kono, Kodaira (JP)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 15/240,320

(22) Filed: Aug. 18, 2016

(65) Prior Publication Data
US 2017/0070970 A1    Mar. 9, 2017

(30) Foreign Application Priority Data

Sep. 3, 2015  (JP) ................................. 2015-174096

(51) Int. Cl.
*H04W 56/00* (2009.01)
*H04B 7/185* (2006.01)
(Continued)

(52) U.S. Cl.
CPC .......... *H04W 56/0015* (2013.01); *H04B 7/08* (2013.01); *H04B 7/1851* (2013.01);
(Continued)

(58) Field of Classification Search
CPC .......... H04W 56/0015; H04W 72/0453; H04B 7/1851; H04B 7/08; H04B 7/155; H04L 69/22
See application file for complete search history.

(56) References Cited

U.S. PATENT DOCUMENTS

| 8,942,325 B2* | 1/2015 | Hasegawa ........... H04L 27/2647 375/340 |
| 2011/0317746 A1* | 12/2011 | Aoki ..................... H04B 7/155 375/213 |

(Continued)

FOREIGN PATENT DOCUMENTS

| JP | 2003-234683 A | 8/2003 |
| JP | 2005-333291 A | 12/2005 |
| JP | 2005-333294 A | 12/2005 |

OTHER PUBLICATIONS

Extended European Search Report dated Jan. 20, 2017, issued in counterpart European Patent Application No. 16183342.1. (7 pages).
(Continued)

*Primary Examiner* — Pao Sinkantarakorn
*Assistant Examiner* — Kabir U Jahangir
(74) *Attorney, Agent, or Firm* — Westerman, Hattori, Daniels & Adrian, LLP

(57) ABSTRACT

A non-transitory computer-readable storage medium stores a program that causes a computer to execute a process. The process includes receiving radio signals from base stations, the radio signals being generated by the base stations based on a modulated signal received at the base stations; determining one or more reception target signals in the received radio signals, the reception target signals having a predetermined target frequency and being modulated according to a predetermined target modulation scheme; aligning the reception target signals with each other; generating a demodulation target signal based on the aligned reception target signals; and demodulating the generated demodulation target signal.

12 Claims, 12 Drawing Sheets

(51) Int. Cl.
*H04L 29/06* (2006.01)
*H04W 72/04* (2009.01)
*H04B 7/08* (2006.01)
*H04B 7/155* (2006.01)

(52) U.S. Cl.
CPC ......... *H04L 69/22* (2013.01); *H04W 72/0453* (2013.01); *H04B 7/155* (2013.01)

(56) References Cited

U.S. PATENT DOCUMENTS

| | | |
|---|---|---|
| 2013/0128929 A1 | 5/2013 | Clevorn et al. |
| 2013/0251060 A1* | 9/2013 | Ikushima ............ H04L 25/4919 375/286 |
| 2014/0153674 A1 | 6/2014 | Stratigos, Jr. |

OTHER PUBLICATIONS

Holma H., et al. "WCDMA for UMTS", Jan. 1, 2001, WCDMA for UMTS: Radio Access for Third Generation Mobile Communications, Chichester, John Wiley & Sons, GB, pp. 25-38, 84.

* cited by examiner

FIG.7

| FREQUENCY f1 | |
|---|---|
| RECEPTION TIME SLOT | STORAGE AREA |
| 2015/8/20<br>10:01~10:05 | AREA_A-1 |
| 2015/8/20<br>10:06~10:10 | AREA_A-2 |
| | |

STORAGE MEDIUM, RADIO SIGNAL DEMODULATION METHOD, AND RADIO SIGNAL DEMODULATION APPARATUS

CROSS-REFERENCE TO RELATED APPLICATION

This application is based upon and claims the benefit of priority of Japanese Patent Application No. 2015-174096 filed on Sep. 3, 2015, the entire contents of which are incorporated herein by reference.

FIELD

An aspect of this disclosure relates to a storage medium, a radio signal demodulation method, and a radio signal demodulation apparatus.

BACKGROUND

There exist communication technologies using a high-frequency band between 3 and 30 MHz (see, for example, Japanese Laid-Open Patent Publication No. 2005-333291 and Japanese Laid-Open Patent Publication No. 2003-234683). A radio signal in the high-frequency band is reflected by the ionosphere and the surface of the earth and can travel a long distance, and is therefore used for long-distance communications.

However, the condition of the ionosphere changes as time passes and depending on the condition, the ionosphere allows a radio signal to pass therethrough, attenuates a radio signal, or reflects a radio signal. Also, the ionosphere behaves differently toward radio signals with different frequencies.

For the above reasons, communications using the high-frequency band are liable to be affected by the ever-changing ionosphere and are unstable. Accordingly, it is desired to improve the transmission quality of communications using the high-frequency band.

SUMMARY

According to an aspect of this disclosure, there is provided a non-transitory computer-readable storage medium storing a program that causes a computer to execute a process. The process includes receiving radio signals from base stations, the radio signals being generated by the base stations based on a modulated signal received at the base stations; determining one or more reception target signals in the received radio signals, the reception target signals having a predetermined target frequency and being modulated according to a predetermined target modulation scheme; aligning the reception target signals with each other; generating a demodulation target signal based on the aligned reception target signals; and demodulating the generated demodulation target signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a drawing illustrating an exemplary storage table;

DESCRIPTION OF EMBODIMENTS

An aspect of this disclosure provides a storage medium, a radio signal demodulation method, and a radio signal demodulation apparatus that can improve the accuracy of information obtained from a radio signal.

Embodiments of the present invention are described below with reference to the accompanying drawings.

<First Embodiment>

Figure 1:
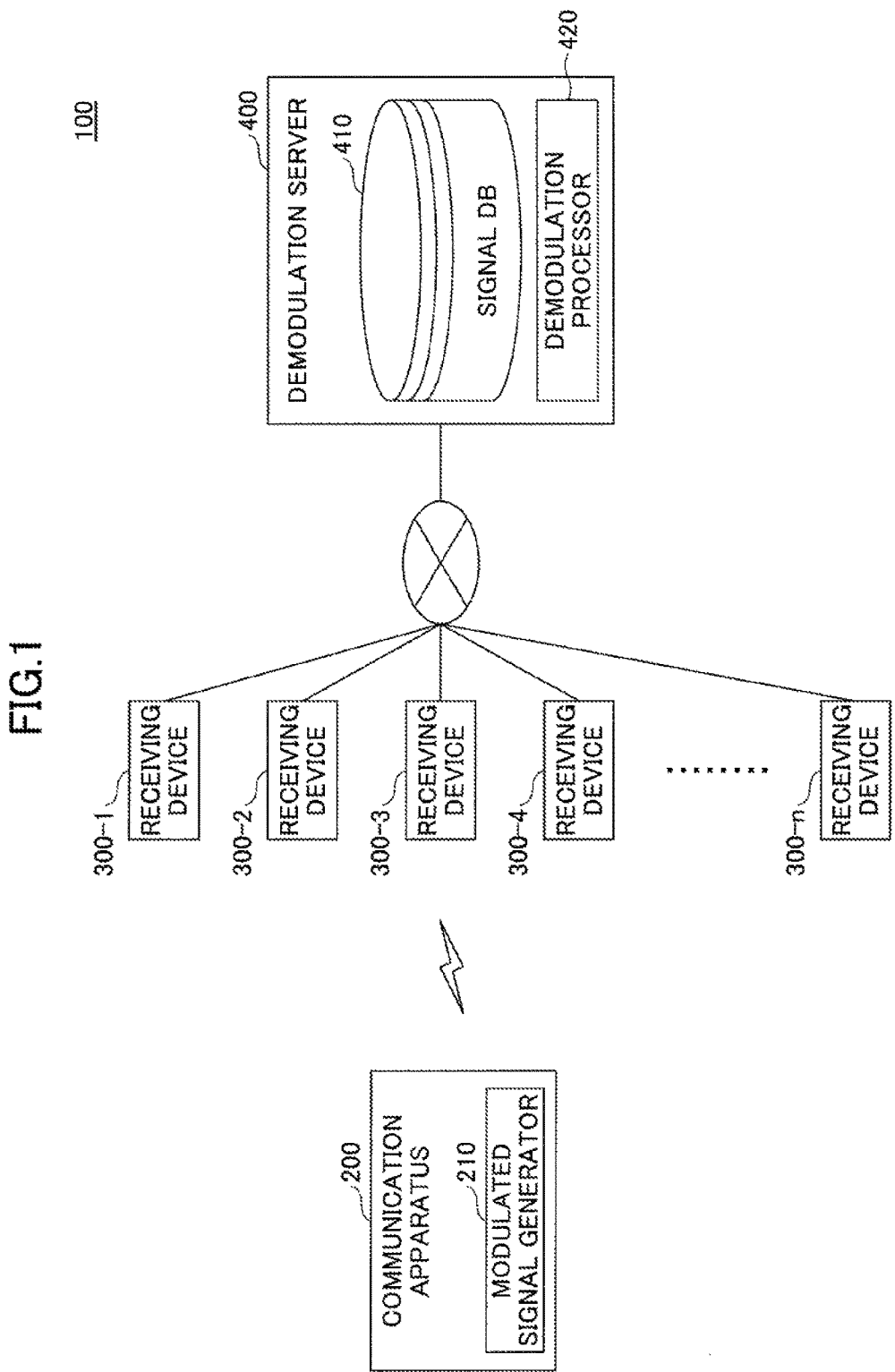
FIG. 1 is a drawing illustrating an exemplary configuration of a communication system according to a first embodiment.

FIG. 1 is a drawing illustrating an exemplary configuration of a communication system 100 according to a first embodiment.

The communication system 100 may include a communication apparatus 200, receiving devices 300-1 through 300-n, and a demodulation server 400. In the present embodiment, the communication apparatus 200 and the receiving devices 300-1 through 300-n wirelessly communicate with each other. Also, the receiving devices 300-1 through 300-n and the demodulation server 400 communicate with each other via a wired network. The communication apparatus 200 and the receiving devices 300-1 through 300-n perform radio communications (multiband radio communications) using multiple carrier waves with different frequencies.

In the communication system 100, when a message is input, a modulated signal generator 210 of the communication apparatus 200 generates a modulated signal (radio signal) by superimposing information indicating the message on multiple carrier waves with different frequencies, and wirelessly transmits the modulated signal to a destination.

In the present embodiment, it is assumed that the frequencies of carrier waves (carrier frequencies) are within a high-frequency band between 3 and 30 MHz. Also, it is assumed that a predetermined modulation scheme is used in the communication system 100.

In the present embodiment, a message may include identification information for identifying the communication apparatus 200 that is the sender of the message and transmission information that is input at the communication apparatus 200 and to be transmitted to a destination. Examples of the transmission information may include audio data and text data.

The receiving devices 300-1 through 300-n are included in base stations situated in various locations. When a modulated signal is received from the communication apparatus 200, each of the receiving devices 300-1 through 300-n attaches a header information signal to the modulated signal, and transmits the modulated signal with the header information signal to the demodulation server 400. Hereafter, a modulated signal to which a header information signal is attached is referred to as a "header-attached modulated signal".

When header-attached modulated signals are received from the receiving devices 300-1 through 300-n, the demodulation server 400 stores the header-attached modulated signals in a signal database (DB) 410.

More specifically, the demodulation server 400 stores, in the signal database 410, one or more of the received header-attached modulated signals (reception target signals) that have a carrier frequency corresponding to a preset target frequency and have been modulated according to a preset target modulation scheme.

A demodulation processor 420 of the demodulation server 400 extracts, from the signal database 410, header-attached modulated signals that have the same carrier frequency and were received in the same time slot, and generates a demodulation target signal to be demodulated based on the extracted header-attached modulated signals.

More specifically, based on the extracted header-attached modulated signals, the demodulation processor 420 generates a demodulation target signal having a waveform that is closest to the waveform of a modulated signal generated by the modulated signal generator 210 of the communication apparatus 200.

Then, the demodulation processor 420 demodulates the generated demodulation target signal to extract the message, and transmits the message to its destination.

Thus, according to the present embodiment, based on header-attached modulated signals received from the receiving devices 300-1 through. 300-n, the demodulation server 400 generates and demodulates a demodulation target signal having a waveform closest to the waveform of the modulated signal transmitted by the communication apparatus 200. In other words, in the present embodiment, instead of demodulating header-attached modulated signals themselves, a modulation target signal is generated from the header-attached modulated signals and then demodulated. This configuration makes it possible to extract a signal that is very close to a modulated signal transmitted from the communication apparatus 200, and thereby makes it possible to improve the accuracy of information obtained from a radio signal.

In the descriptions below, the receiving devices 300-1 through 300-n may be referred to as a "receiving device 300" or "receiving devices 300" when it is not necessary to distinguish them.

Next, an exemplary application of the communication system 100 is described with reference to FIG. 2.

The communication system 100 may be applied to, for example, communications between a ship 2 at sea and a communication facility 3 on land.

In this example, the communication apparatus 200 is provided on the ship 2, and the demodulation server 400 is installed in the communication facility 3.

Figure 2:
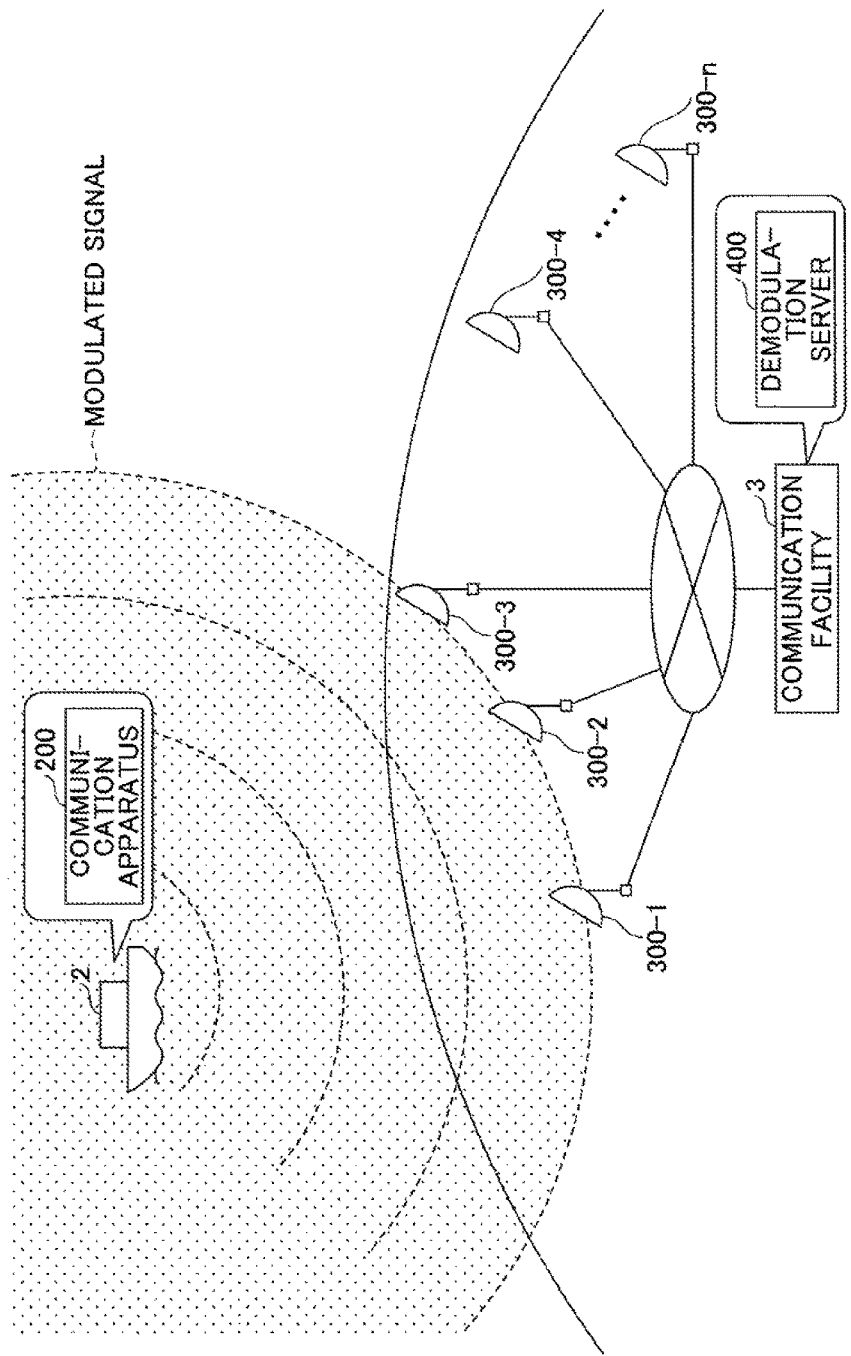
FIG. 2 is a drawing illustrating an exemplary application of the communication system of the first embodiment.

As illustrated by FIG. 2, when a modulated signal is transmitted from the communication apparatus 200 on the ship 2, the modulated signal is reflected by the ionosphere and the surface of the earth and reaches land. The receiving devices 300-1 through 300-n are installed on land. Each receiving device 300 receiving the modulated signal attaches a header information signal to the received modulated signal to generate a header-attached modulated signal, and transmits the header-attached modulated signal to the demodulation server 400 of the communication facility 3.

Here, the modulated signal may not necessarily be received by all of the receiving devices 300-1 through 300-n. In the example of FIG. 2, the receiving devices 300-1, 300-2, and 300-3 are located in an area where a part of the modulated signal can be received. On the other hand, the receiving device 300-4 is located in an area where the modulated signal can hardly be received.

In this case, it may not be possible to obtain the same information as the information used to generate the modulated signal at the communication apparatus 200 by demodulating respective header-attached modulated signals transmitted from the receiving devices 300-1 through 300-4. That is, a message transmitted from the communication apparatus 200 may not be correctly conveyed to the destination.

For the above reasons, in the present embodiment, instead of separately demodulating the header-attached modulated signals transmitted from the receiving devices 300-1 through 300-4, a demodulation target signal having a waveform closest to the waveform of the modulated signal transmitted by the communication apparatus 200 is generated based on the header-attached modulated signals.

Examples of a modulated signal, header-attached modulated signals, and a demodulation target signal are described with reference to FIG. 3.

Figure 3:
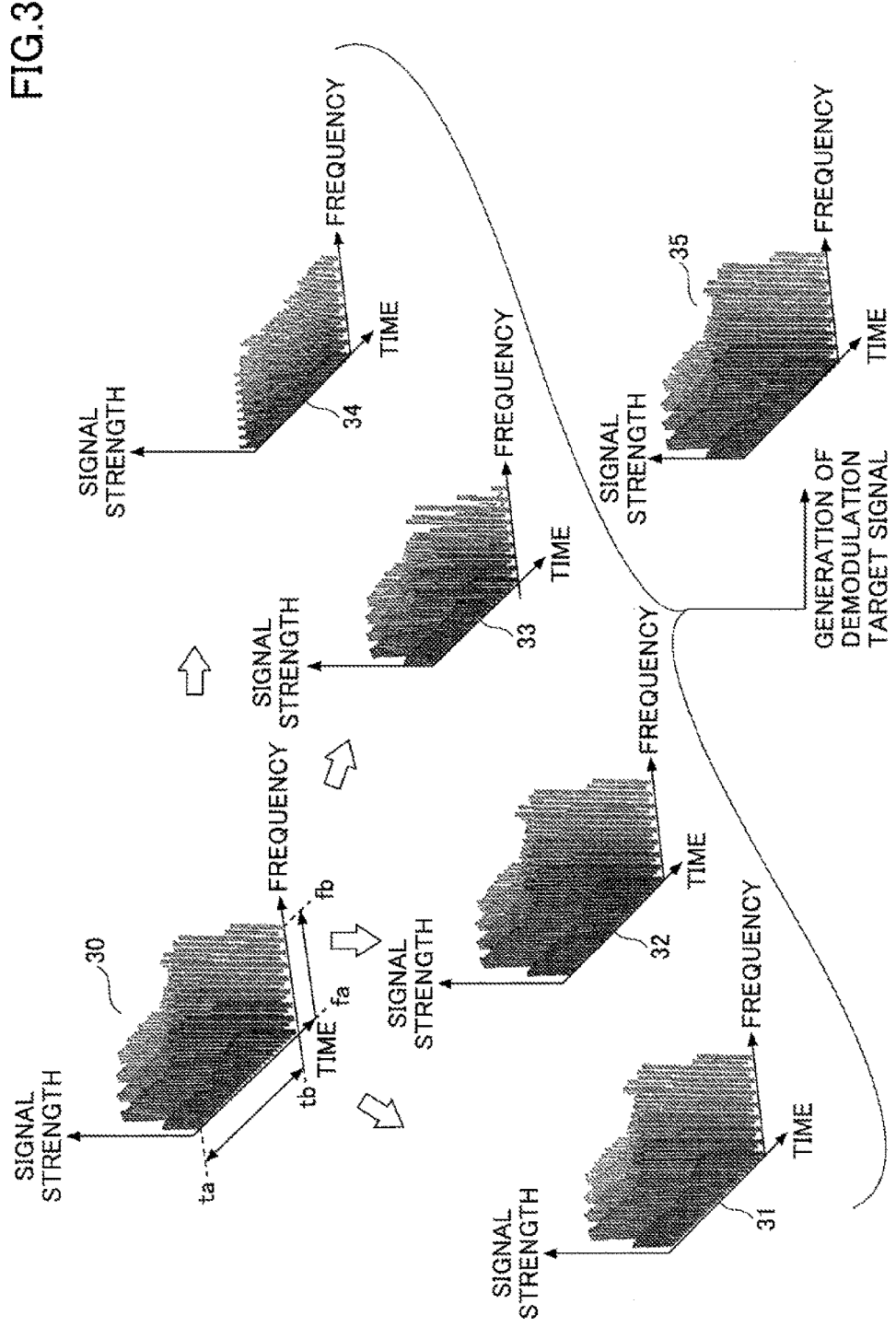
FIG. 3 is a drawing illustrating a modulated signal, header-attached modulated signals, and a demodulation target signal.

As illustrated by FIG. 3, when a modulated signal 30 is received from the communication apparatus 200, the respective receiving devices 300-1 through 300-4 attach a header information signal to the modulated signal 30 to generate header-attached modulated signals 31 through 34.

In FIG. 3, each signal is represented by a time axis, a frequency axis, and a signal-strength axis. The modulated signal 30 of FIG. 3 is generated by modulating multiple carrier waves having different frequencies within a frequency range between fa and fb. Also in FIG. 3, the modulated signal 30 is transmitted during a period between a time ta and a time tb.

In FIG. 3, the header information signal is omitted from the header-attached modulated signal 31. That is, only a portion of the header-attached modulated signal 31 corresponding to the modulated signal received by the receiving device 300-1 is illustrated in FIG. 3. Similarly, only portions of the header-attached modulated signals 32, 33, and 34 corresponding to the modulated signals received by the respective receiving devices 300-2, 300-3, and 300-4 are illustrated in FIG. 3.

In FIG. 3, the signal strength of the header-attached modulated signal 34 of the receiving device 300-4 is far lower than the signal strength of the modulated signal 30.

On the other hand, the waveforms of the header-attached modulated signal 31 of the receiving device 300-1 and the header-attached modulated signal 32 of the receiving device 300-2 are close to the waveform of the modulated signal 30.

This indicates that the receiving device 300-1 and the receiving device 300-2 have received the modulated signal 30 at high quality.

The waveform of the header-attached modulated signal 33 of the receiving device 300-3 is different from the waveform of the modulated signal 30. This indicates that the modulated signal 30 received by the receiving device 300-3 is influenced by, for example, noise.

In the present embodiment, it is assumed that as the signal strength values of a header-attached modulated signal at respective points defined by frequencies and time points in a time scale, which has a resolution corresponding to the modulation rate of the header-attached modulated signal, become closer to the signal strength values of a modulated signal at the corresponding frequencies and time points, the waveform of the header-attached modulated signal becomes closer to the waveform of the modulated signal.

The header-attached modulated signals 31 through 34 are transmitted to the demodulation server 400. The demodulation server 400 compares the header-attached modulated signals 31 through 34 with each other, and determines target signal strength values to be used to generate a demodulation target signal 35 based on the signal strength values of the header-attached modulated signals 31 through 34 at respective points that are defined by frequencies and time points. The time points are defined by a time scale with a resolution corresponding to the modulation rate of the header-attached modulated signals 31 through 34.

As described above, the demodulation server 400 generates the demodulation target signal 35 having a waveform closest to the waveform of the modulated signal 30 based on the header-attached modulated signals 31 through 34, and then demodulates the generated demodulation target signal 35. This configuration makes it possible to improve transmission quality. Here, the transmission quality indicates a degree to which a signal can be correctly transmitted without noise, echo, and a code error.

Also, the demodulation server 400 stores the header-attached modulated signals 31 through 34 received from the receiving devices 300-1 through 300-4 in the signal database 410. In addition to the header-attached modulated signals 31 through 34, the signal database 410 may also store other header-attached modulated signals received by the modulation server 4 00.

The modulation server 400 may be configured to store received header-attached modulated signals in storage areas of the signal database 410 that correspond to the carrier frequencies of the header-attached modulated signals and the time slots when the header-attached modulated signals were received by the modulation server 400. Details of storing header-attached modulated signals in the signal database 410 are described later.

Figure 4:
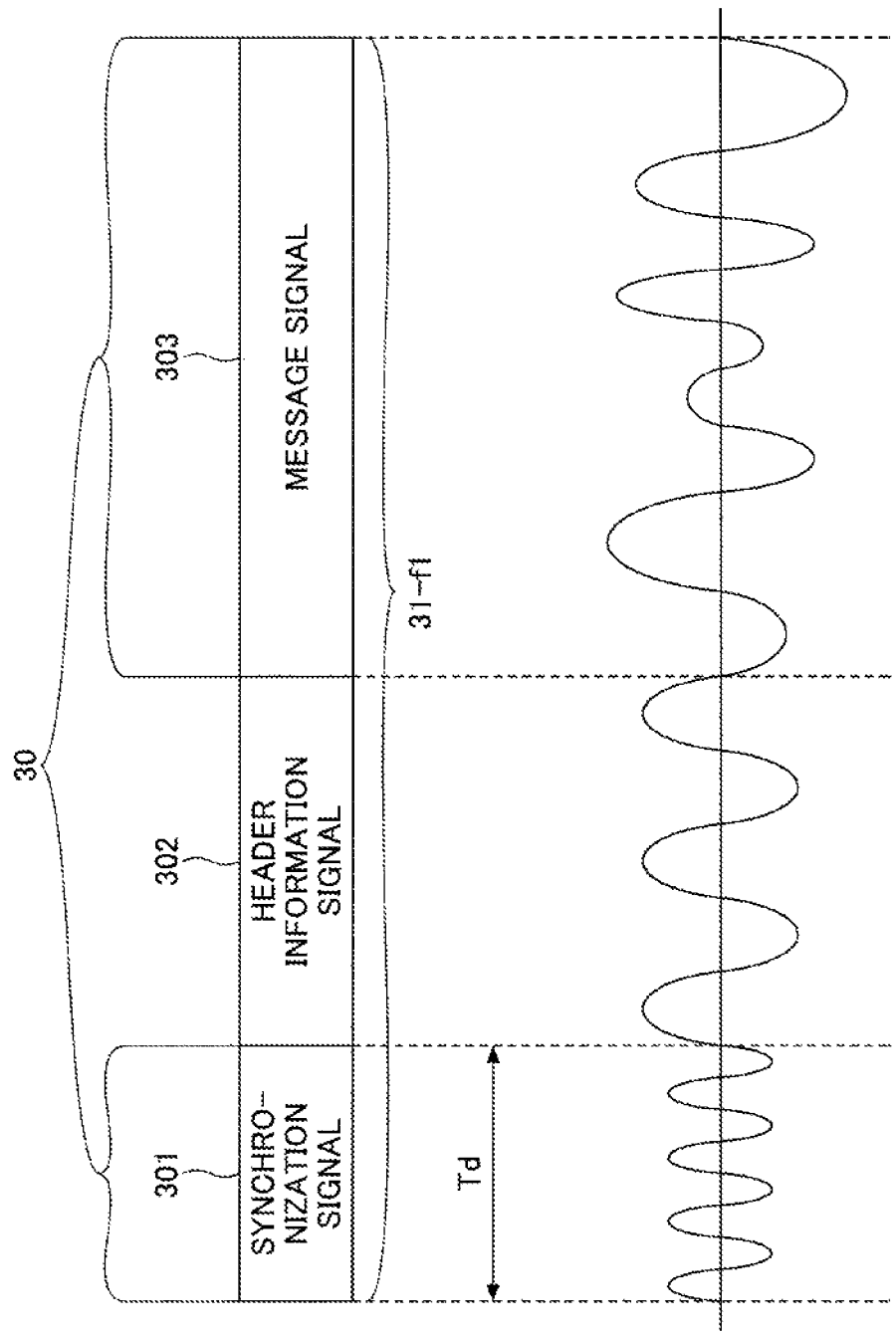
FIG. 4 is a drawing illustrating an exemplary structure of a header-attached modulated signal.

Next, an exemplary structure of a header-attached modulated signal is described with reference to FIG. 4. In FIG. 4, a header-attached modulated signal 31-f1 of the header-attached modulated signal 31 is used as an example. Other header-attached modulated signals may have substantially the same structure.

The header-attached modulated signal 31-f1 of FIG. 4 is included in the header-attached modulated signal 31 and has a carrier frequency f1.

The header-attached modulated signal 31 includes multiple header-attached modulated signals whose carrier waves have different frequencies. For example, when the number of carrier waves having different frequencies and included in a modulated signal is "n", the header-attached modulated signal 31 includes "n" header-attached modulated signals corresponding to the number of carrier waves. The header-attached modulated signals of different frequencies included in the header-attached modulated signal 31 have the same structure.

The header-attached modulated signal 31-f1 includes a synchronization signal 301, a header information signal 302, and a message signal 303.

The header information signal 302 of the header-attached modulated signal 31-f1 indicates header information attached by the receiving device 300-1.

The synchronization signal 301 and the message signal 303 of the header-attached modulated signal 31-f1 are included in the modulated signal transmitted from the communication apparatus 200.

The synchronization signal 301 has a predetermined frequency (synchronization frequency) and is attached to all signals sent and received in the communication system 100. The frequency of the synchronization signal 301 is associated with the communication system 100. When the synchronization signal 301 is present at the head of a received signal, the demodulation server 400 receives signals following the synchronization signal 301. In the present embodiment, the length of the synchronization signal 301 is predetermined. The length of the synchronization signal 301 corresponds to a time period for which the synchronization signal 301 is output from the communication apparatus 200. In the present embodiment, the length of the synchronization signal 301 is set at Td seconds.

The header information signal 302 may include positional information of the receiving device 300-1, information indicating the date and time when the modulated signal 30 is received by the receiving device 300-1, information indicating the frequency of the carrier wave, and information indicating a modulation scheme.

The positional information of the receiving device 300-1 may be, for example, an identifier identifying the receiving device 300-1 or information indicating the latitude and longitude of a location where the receiving device 300-1 is installed. The header information signal 302 may also include information indicating the type of a message.

The message signal 303 includes a message and is used by the communication apparatus 200 to modulate the carrier wave.

Figure 5:
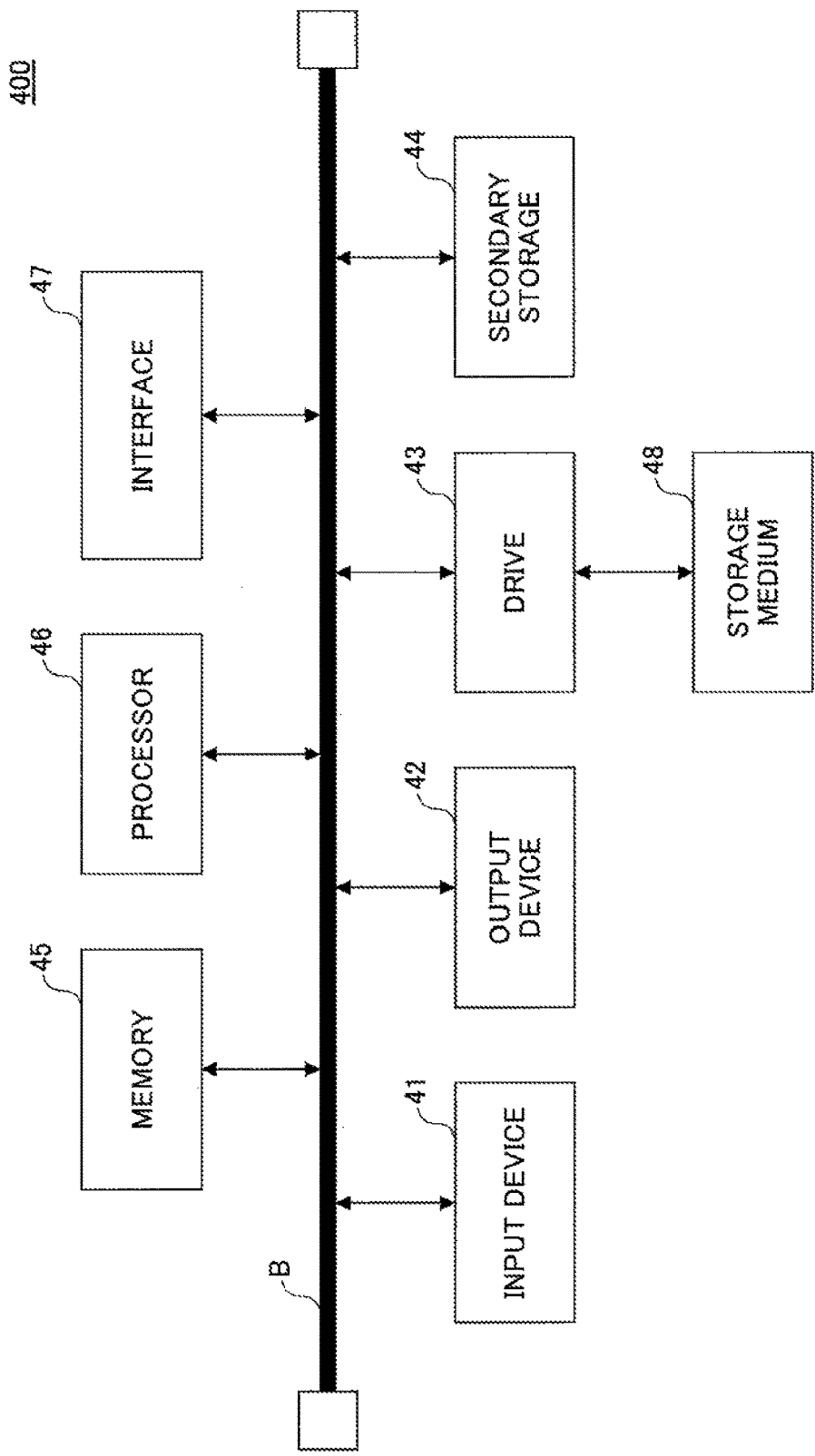
FIG. 5 is a block diagram illustrating an exemplary hardware configuration of a demodulation server.

Next, an exemplary hardware configuration of the demodulation server 400 of the present embodiment is described with reference to FIG. 5.

The demodulation server 400 may include an input device 41, an output device 42, a drive 43, a secondary storage 44, a memory 45, a processor 46, and an interface 47 that are connected to each other via a bus B.

The input device 41 is, for example, a keyboard and is used to input various types of information and signals. The output device 42 is, for example, a display and is used to output various types of information and signals.

The interface 47 includes, for example, a modem and a LAN card, and is used to connect the demodulation server 400 to a network.

The demodulation server 400 may include a demodulation program that is one of programs for controlling the demodulation server 400. For example, the demodulation program may be provided via a storage medium 48 or downloaded from a network. Examples of the storage medium 48 for storing the demodulation program include storage media such as a compact disk read-only memory (CD-ROM), a flexible disk, and a magneto-optical disk that record information optically, electrically, or magnetically; and semiconductor memories such as a read-only memory (ROM) and a flash memory that record information electrically.

When the storage medium 48 storing the demodulation program is mounted on the drive 43, the demodulation program is read by the drive 43 from the storage medium 48 and installed in the secondary storage 44. On the other hand, when the demodulation program is downloaded from a network, the demodulation program is installed via the interface 47 in the secondary storage 44.

The secondary storage 44 stores the installed demodulation program and other necessary files and data. The memory 45 stores the demodulation program read from the secondary storage 44 when the demodulation server 400 (or a computer) is started. The processor 46 executes the demodulation program stored in the memory 45 to perform various processes described later.

The demodulation server 400 may also be implemented by a tablet computer including a display console that includes functions of both of the input device 41 and the output device 42.

The communication apparatus 200 may have a hardware configuration of a typical radio communication apparatus, and its descriptions are omitted.

Figure 6:
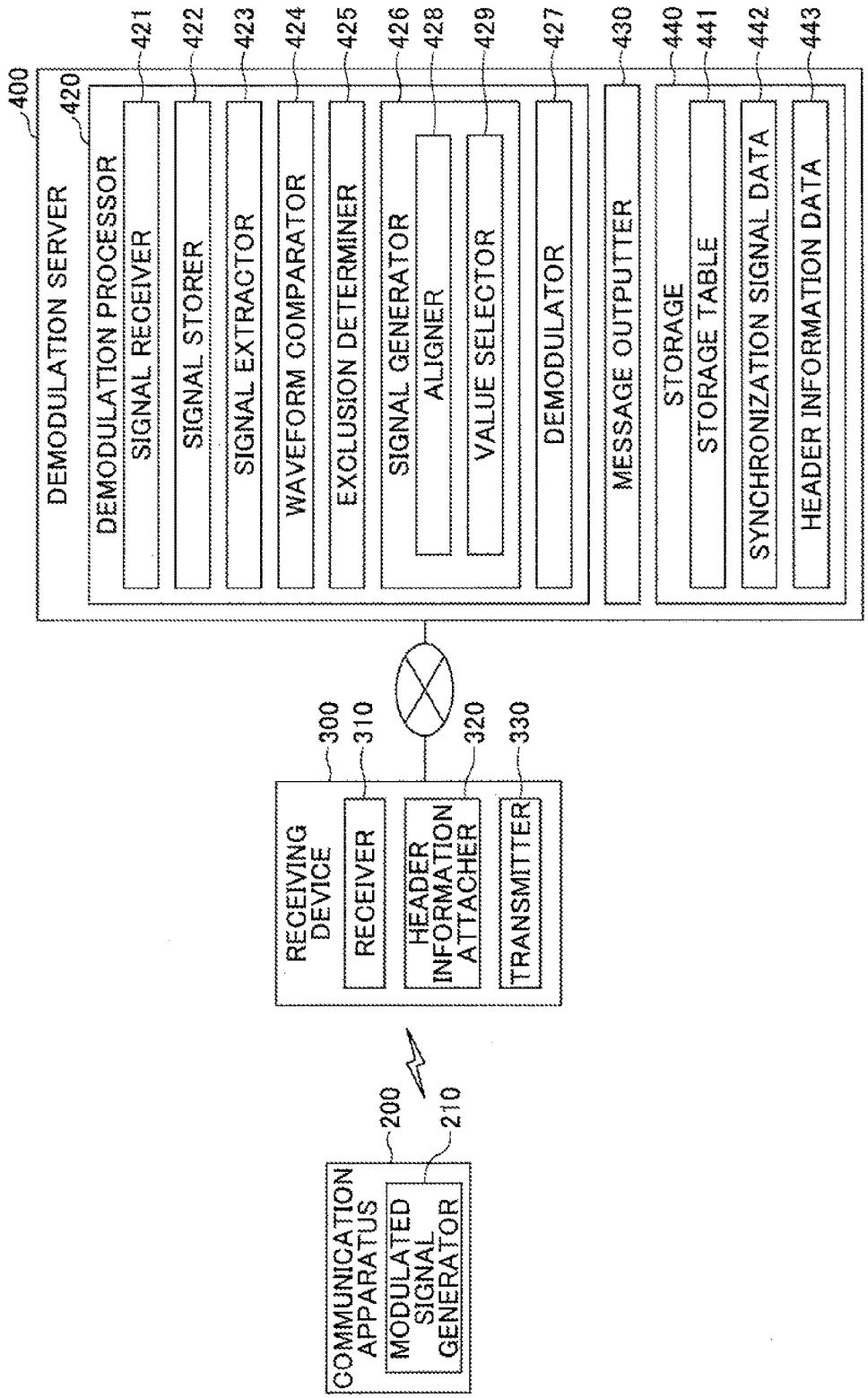
FIG. 6 is a drawing illustrating exemplary functional configurations of a communication apparatus, a receiving device, and a demodulation server.

Next, exemplary functional configurations of the communication apparatus 200, the receiving device 300, and the demodulation server 400 of the communication system 100 are described with reference to FIG. 6.

The communication apparatus 200 may include a modulated signal generator 210. The modulated signal generator 210 modulates carrier waves in a predetermined frequency band to superimpose a message input to the communication apparatus 200 on the carrier waves, and generates the modulated signal 30 to the head of which a synchronization signal is attached.

In the present embodiment, parameters such as a frequency fd, a signal strength, and a length Td [sec] of the synchronization signal are preset in the modulated signal generator 210. Based on these parameters, the modulated signal generator 210 generates the synchronization signal with a waveform similar to that of synchronization signal data 442 described later.

The receiving device 300 may include a receiver 310, a header information attacher 320, and a transmitter 330.

The receiver 310 receives a modulated signal transmitted from the communication apparatus 200. The receiver 310 receives not only the modulated signal transmitted from the communication apparatus 200, but also modulated signals transmitted from other sources as long as they are generated by modulating the carrier waves in the predetermined frequency band.

The header information attacher 320 attaches a header information signal to the received modulated signal to generate a header-attached modulated signal.

The header information signal may include fixed information in addition to information indicating the position of the receiving device 300 and information indicating the date and time when the modulated signal is received. The fixed information may be represented by signals with predetermined waveforms stored as header information data 443 described later.

The transmitter 330 transmits the generated header-attached modulated signal to the demodulation server 400.

The demodulation server 400 may include a demodulation processor 420, a message outputter 430, and a storage 440. Details of the demodulation processor 420 are described later.

The message outputter 430 outputs (or transmits) a message demodulated by the demodulation processor 420 based on destination information included in the message.

The storage 440 may be implemented by storage areas of a storage device(s) such as the secondary storage 44 and/or the memory 45 of the modulation server 400, The storage 440 stores a storage table 441, synchronization signal data 442, and header information data 443.

The storage table 441 is referred to by the demodulation server 400 when storing a received header-attached modulated signal in the signal database 410. The storage table 441 stores, for each carrier frequency, information indicating time slots when header-attached modulated signals were received by the demodulation server 400 in association with information indicating storage areas where the header-attached modulated signals are stored. Details of the storage table 441 are described later.

The synchronization signal data 442 is referred to by a signal generator 426 described later. The synchronization signal data 442 indicates a waveform of the synchronization signal with a predetermined frequency fd, a predetermined signal strength, and a predetermined length Td [sec]. Thus, the synchronization signal data 442 is pre-generated waveform data stored in the storage 440.

The header information data 443 is referred to by the signal generator 426 described later. The header information data 443 indicates waveforms of signals representing fixed information such as a modulation scheme employed in the communication system 100 and types of messages. Thus, the header information data 443 is pre-generated waveform data stored in the storage 440.

Next, the demodulation processor 420 is described. Functions of the demodulation processor 420 may be implemented by executing a demodulation program by the processor 46 of the demodulation server 400.

The demodulation processor 420 may include a signal receiver 421, a signal storer 422, a signal extractor 423, a waveform comparator 424, an exclusion determiner 425, a signal generator 426, and a demodulator 427.

The signal receiver 421 receives a header-attached modulated signal from the receiving device 300.

The signal storer 422 stores the received header-attached modulated signal in the signal database 410 when it is detected that the received header-attached modulated signal has a carrier frequency corresponding to a preset target frequency and has been modulated according to a preset target modulation scheme.

The signal storer 422 stores the received header-attached modulated signal in a storage area of the signal database 410 that corresponds to the carrier frequency of the header-attached modulated signal and the time slot when the header-attached modulated signal is received by the modulation server 400. Here, the header-attached modulated signal stored by the signal storer 422 in the signal database 410 has not been demodulated. Details of a process performed by the signal storer 422 are described later.

The signal extractor 423 extracts, from the signal database 410, header-attached modulated signals having the same carrier frequency and received in a specific (or the same) time slot.

The waveform comparator 424 compares the waveforms of synchronization signals included in the header-attached modulated signals extracted by the signal extractor 423 with the synchronization signal data 442 to calculate synchronization signal matching degrees indicating the degrees to which the waveforms of the synchronization signals match the synchronization signal data 442. The waveform comparator 424 also compares the waveforms of header information signals included in the header-attached modulated signals extracted by the signal extractor 423 with the header information data 443 to calculate header information matching degrees indicating the degrees to which the waveforms of the header information signals match the header information data 443.

The exclusion determiner 425 excludes header-attached modulated signals, whose synchronization signal matching degrees and header information matching degrees calculated by the waveform comparator 424 are both less than predetermined thresholds, from being used in a signal generation process.

In other words, the exclusion determiner 425 selects a header-attached modulated signal as a target signal to be used in a signal generation process when the header-attached modulated signal includes a correct synchronization signal and a correct header information signal (which may be referred to as "characteristic signals") that characterize a header-attached modulated signal. On the other hand, when there are errors in the synchronization signal and the header information signal in a header-attached modulated signal, the exclusion determiner 425 excludes the header-attached modulated signal from being used in a signal generation process.

The signal generator 426 generates a demodulation target signal based on remaining header-attached modulated signals (i.e., target signals) that have not been excluded by the exclusion determiner 425. The signal generator 426 may include an aligner 428 and a value selector 429. The aligner 428 aligns the remaining header-attached modulated signals with each other. The value selector 429 determines target signal strength values to be used to generate a demodulation target signal based on the aligned header-attached modulated signals. Details of a process performed by the signal generator 426 are described later.

The demodulator 427 demodulates the demodulation target signal generated by the signal generator 426 to extract a message, and outputs the extracted message to the message outputter 430.

Next, an exemplary process performed by the signal storer 422 is described with reference to FIG. 7. FIG. 7 is a drawing illustrating an example of the storage table 441.

FIG. 7 illustrates the storage table 441 for header-attached modulation signals with a carrier frequency f1. In the present embodiment, it is assumed that a storage table 441 is provided for each of carrier frequencies of header-attached modulated signals received by the demodulation server 400.

The storage table 441 may include "reception time slot" and "storage area" as information items. The "reception time slot" is an information item that indicates a date and a time slot (or time period) when a header-attached modulated signal was received by the demodulation server 400. The "storage area" is an information item that identifies a storage area where a header-attached modulated signal having the carrier frequency f1 and received in the corresponding time slot is stored.

According to the exemplary storage table 441 of FIG. 7, a header-attached modulated signal received in a time slot between 10:01 and 10:05 on 2015 Aug. 20 is stored in an area A-1 of the signal database 410. Also according to the storage table 441, a header-attached modulated signal received in a time slot between 10:06 and 10:10 on 2015 Aug. 20, is stored in an area A-2 of the signal database 410.

When a header-attached modulated signal is received, the signal storer 422 refers to the storage table 441, and stores the received header-attached modulated signal in a storage area of the signal database 410 that is associated with the carrier frequency and the reception time slot of the received header-attached modulated signal.

As described above, in the present embodiment, a header-attached modulated signal is stored in the signal database 410 in association with the carrier frequency and the reception time slot of the header-attached modulated signal. This configuration makes it possible to group header-attached modulated signals that are assumed to include the same modulated signal transmitted from the communication apparatus 200, and makes it easier to manage header-attached modulated signals.

Although the signal storer 422 of the present embodiment is configured to store header-attached modulated signals in an appropriate storage area by referring to the storage table 441, the present invention is not limited to this embodiment. For example, storage areas for respective carrier frequencies of header-attached modulated signals may be preset in the signal storer 422, and the signal storer 422 may be configured to generate, in each predetermined time slot, information that associates a reception time slot with the identification information of a storage area where header-attached modulated signals are stored.

That is, the signal storer 422 may be configured to generate the storage table 441 while storing header-attached modulated signals in the signal database 410.

For example, assume that an area A of the signal database 410 is preset for header-attached modulated signals with the carrier frequency f1.

In this case, the signal storer 422 stores header-attached modulated signals received in a time slot between 10:01 and 10:05 on 2015 Aug. 20, in the area A. Then, at 10:06, the signal storer 422 assigns an identifier "area A-1" to an area in the area A where the header-attached modulated signals are stored, and stores the identifier "area A-1" in the storage 440 in association with the reception time slot "2015 Aug. 20, 10:01-10:05".

Similarly, the signal storer 422 stores header-attached modulated signals received in a time slot between 10:06 and 10:10 on 2015 Aug. 20, in an area other than the area A-1 in the area A. Then, at 10:11, the signal storer 422 assigns an identifier "area A-2" to the area where the header-attached modulated signals received in the time slot between 10:06 and 10:10 are stored, and stores the identifier "area A-2" in the storage 440 in association with the reception time slot "2015 Aug. 20, 10:06-10:10".

Thus, the signal storer 422 may be configured to generate the storage table 441 associating reception time slots and storage areas while receiving header-attached modulated signals. This configuration eliminates the need to determine storage areas for respective reception time slots in advance. This in turn makes it possible to allocate, to header-attached modulated signals received in each reception time slot, a storage area with a size corresponding to the actual size of the received header-attached modulated signals.

Figure 8:
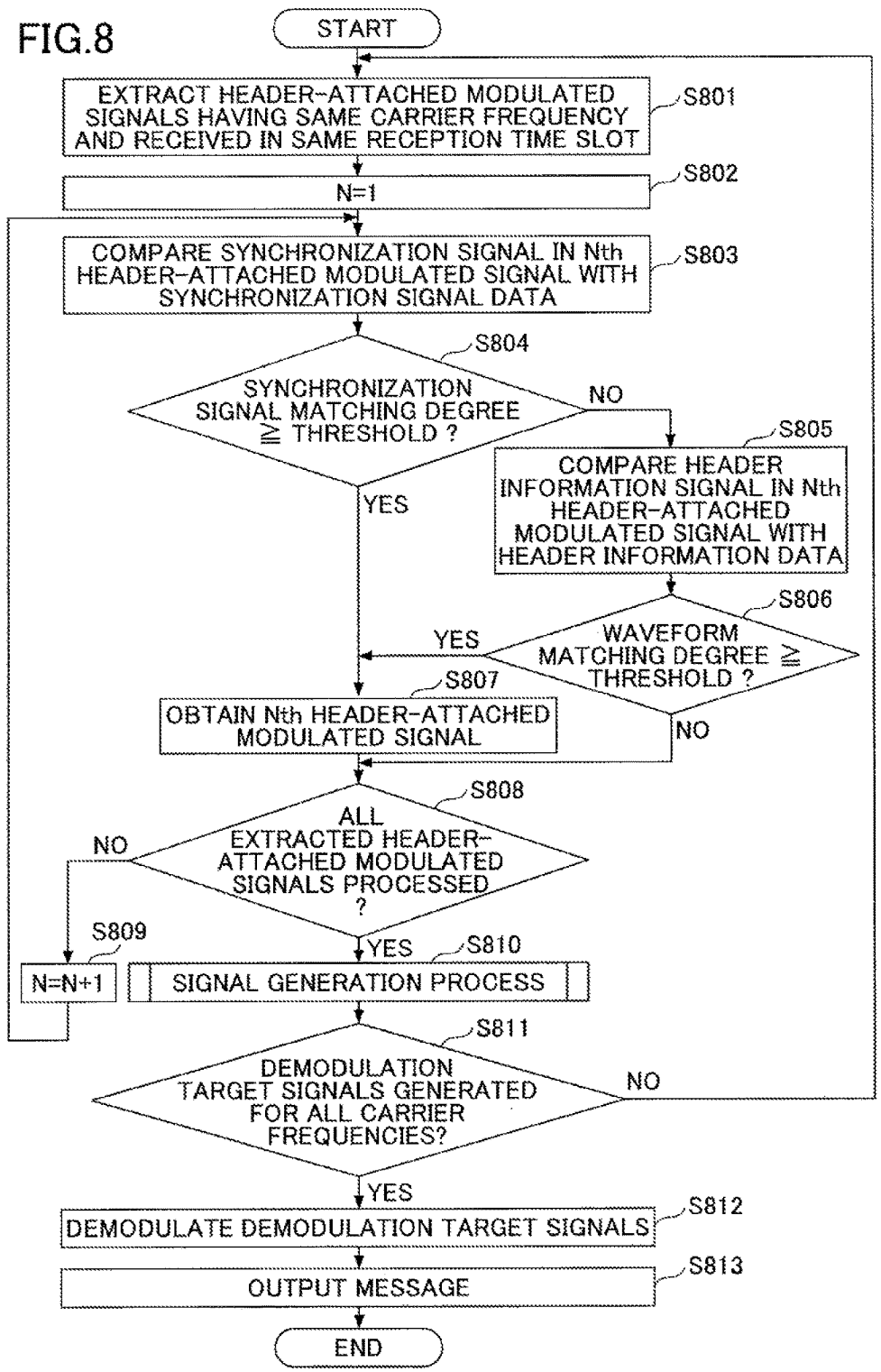
FIG. 8 is a flowchart illustrating an exemplary process performed by a demodulation server according to the first embodiment.
Figure 9:
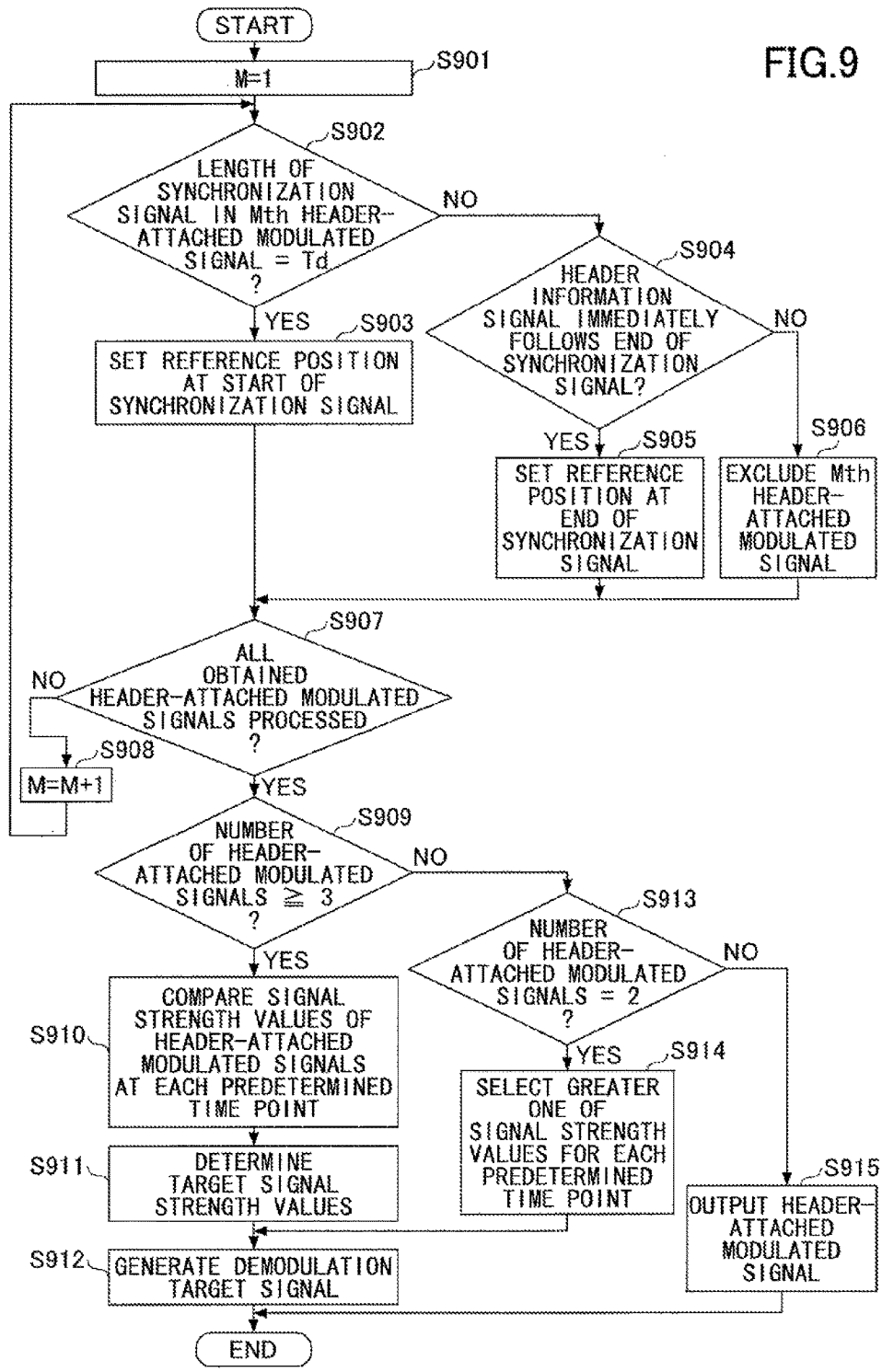
FIG. 9 is a flowchart illustrating details of a step in the process of FIG. 8.

Next, exemplary processes performed by the demodulation server 400 are described with reference to FIGS. 8 and 9. FIG. 8 is a flowchart illustrating an exemplary process performed by the demodulation server 400 according to the first embodiment.

The signal extractor 423 of the demodulation processor 420 of the demodulation server 400 extracts header-attached modulated signals having the same carrier frequency and received in the same reception time slot from the signal database 410 (step S801). Next, the demodulation processor 420 sets a variable N at 1 (N=1) (step S802).

The waveform comparator 424 of the demodulation processor 420 compares the waveform of a synchronization signal in an Nth header-attached modulated signal of the header-attached modulated signals extracted at step S801 with the synchronization signal data 442 to calculate a synchronization signal matching degree indicating the degree to which the waveform of the synchronization signal matches the synchronization signal data 442 (step S803).

The exclusion determiner 425 of the demodulation processor 420 determines whether the synchronization signal matching degree is greater than or equal to a predetermined threshold (step S804). When the synchronization signal matching degree is greater than or equal to the predetermined threshold, the process proceeds to step S807 where the signal generator 426 obtains the Nth header-attached modulated signal for use in a signal generation process.

When the synchronization signal matching degree is less than the threshold at step S804, the waveform comparator 424 compares the waveform of a header information signal in the Nth header-attached modulated signal with the header information data 443 to calculate a header information matching degree indicating the degree to which the waveform of the header information signal matches the header information data 443 (step S805).

The exclusion determiner 425 of the demodulation processor 420 determines whether a waveform matching degree obtained by combining the synchronization signal matching degree and the header information matching degree is greater than or equal to a predetermined threshold (step S806). That is, at step S806, the exclusion determiner 425 determines the degree to which the waveform from the start of the header-attached modulated signal to the end of the header information signal matches the combination of the synchronization signal data 442 and the header information data 443 is greater than or equal to the predetermined threshold.

The threshold used at step S804 and the threshold used at step S806 may be the same or different from each other. For example, the threshold used at step S804 may be 90%, and the threshold used at step S806 may be 80%. The predetermined thresholds may be stored in, for example, the storage 440.

The waveform comparator 424 may be configured to compare the waveforms with the synchronization signal data 442 and the header information data 443 according to any known waveform comparing technology.

When the waveform matching degree is less than the threshold at step S806, the exclusion determiner 425 determines to not use the Nth header-attached modulated signal in the signal generation process to be performed by the signal generator 426, and the process proceeds to step S808.

When the waveform matching degree is greater than or equal to the threshold at step S806, the signal generator 426 obtains the Nth header-attached modulated signal for use in the signal generation process (step S807).

Next, the signal generator 426 determines whether steps S803 through S807 have been performed on all of the header-attached modulated signals extracted at step S801 (step S808). When steps S803 through S807 have not been performed on ail of the extracted header-attached modulated signals at step S808, the demodulation processor 420 increments the variable N by 1 (N=N+1) (step S809), and the process returns to step S803.

When steps S803 through S807 have been performed on all of the extracted header-attached modulated signals at step S808, the signal generator 426 performs the signal generation process to generate a demodulation target signal using the header-attached modulated signals obtained at step S807 (step S810). Details of step S810 are described later.

Following step S810, the demodulation processor 420 determines whether demodulation target signals have been generated for all carrier frequencies (step S811). When there are remaining carrier frequencies for which demodulation target signals have not been generated at step S811, the process returns to step S801 and steps S801 through S810 are repeated to generate demodulation target signals for the remaining carrier frequencies.

When demodulation target signals have been generated for all carrier frequencies at step S811, the demodulator 427 of the demodulation processor 420 demodulates the demodulation target signals to extract a message (step S812). Then, the message outputter 430 of the demodulation server 400 outputs the extracted message to the destination of the message (step S813).

Next, an exemplary signal generation process (step S810 of FIG. 8) performed by the signal generator 426 is described with reference to FIG. 9. FIG. 9 is a flowchart illustrating details of step S810 of FIG. 8.

The signal generator 426 sets a variable M at 1 (M=1) (step S901). Next, the aligner 428 of the signal generator 426 determines whether the length of the synchronization signal in an Mth header-attached modulated signal of the obtained header-attached modulated signals is Td sec (step S902). When the length of the synchronization signal is Td sec at step S902, the aligner 428 sets a reference position of the Mth header-attached modulated signal at the start of the synchronization signal (step S903), and proceeds to step S907 described later. The reference position is used to align another header-attached modulated signal with the Mth header-attached modulated signal.

When the length of the synchronization signal is less than Td sec at step S902, the aligner 428 determines whether the header information signal immediately follows the end of the synchronization signal (step S904).

When the header information signal immediately follows the end of the synchronization signal at step S904, the aligner 428 sets the reference position of the Mth header-attached modulated signal at the end of the synchronization signal (step S905), and proceeds to step S907.

When the header information signal does not immediately follow the end of the synchronization signal at step S904, the signal generator 426 excludes the Mth header-attached modulated signal from being used in the signal generation process (step S906).

Next, the signal generator 426 determines whether steps S902 through S906 have been performed on all of the obtained header-attached modulated signals (step S907). In other words, at step S907, the signal generator 426 determines whether reference positions have been set by the aligner 428 for all of the obtained header-attached modulated signals (except for the excluded header-attached modulated signals).

When steps S902 through S906 have not been performed on all of the obtained header-attached modulated signals, the signal generator 426 increments the variable M by 1 (M=M+1) (step S908), and returns to step S902.

When steps S902 through S906 have been performed on all of the obtained header-attached modulated signals at step S907, the signal generator 426 determines whether the number of header-attached modulated signals for which reference positions have been set is greater than or equal to three (step S909). When the number of header-attached modulated signals for which reference positions have been set is less than three at step S909, the signal generator 426 proceeds to step S913 described later.

When the number of header-attached modulated signals for which reference positions have been set is greater than or equal to three at step S909, the value selector 429 of the signal generator 426 aligns the header-attached modulated signals with each other at the reference positions, and compares the signal strength values of the header-attached modulated signals at each predetermined time point (step S910). Based on the result of comparison, the value selector 429 determines, for each predetermined time point, a target signal strength value used to generate a demodulation target signal (step S911).

For example, the value selector 429 may be configured to eliminate a signal strength value(s) that is away from other signal strength values in the three or more signal strength values, and obtain a target signal strength value by averaging the remaining signal strength values.

Next, the signal generator 426 associates the target signal strength values with the corresponding time points to generate a demodulation target signal (step S912).

When the number of header-attached modulated signals for which reference positions have been set is less than three at step S909, the signal generator 426 determines whether the number of header-attached modulated signals for which reference positions have been set is two (step S913). When the number of header-attached modulated signals for which reference positions have been set is not two, the signal generator 426 proceeds to step S915 described later.

When the number of header-attached modulated signals for which reference positions have been set is two at step S913, the value selector 429 aligns the header-attached modulated signals with each other at the reference positions, and compares the two signal strength values of the header-attached modulated signals at each predetermined time point. Then, the value selector 429 selects, for each predetermined time point, a greater one of the two signal strength values as a target signal strength value (step S914), and the process proceeds to step S312.

When the number of header-attached modulated signals for which reference positions have been set is not two at step S913, i.e., the reference position is set for only one header-attached modulated signal, the signal generator 426 outputs the header-attached modulated signal as a demodulation target signal (step S915).

Figure 10:
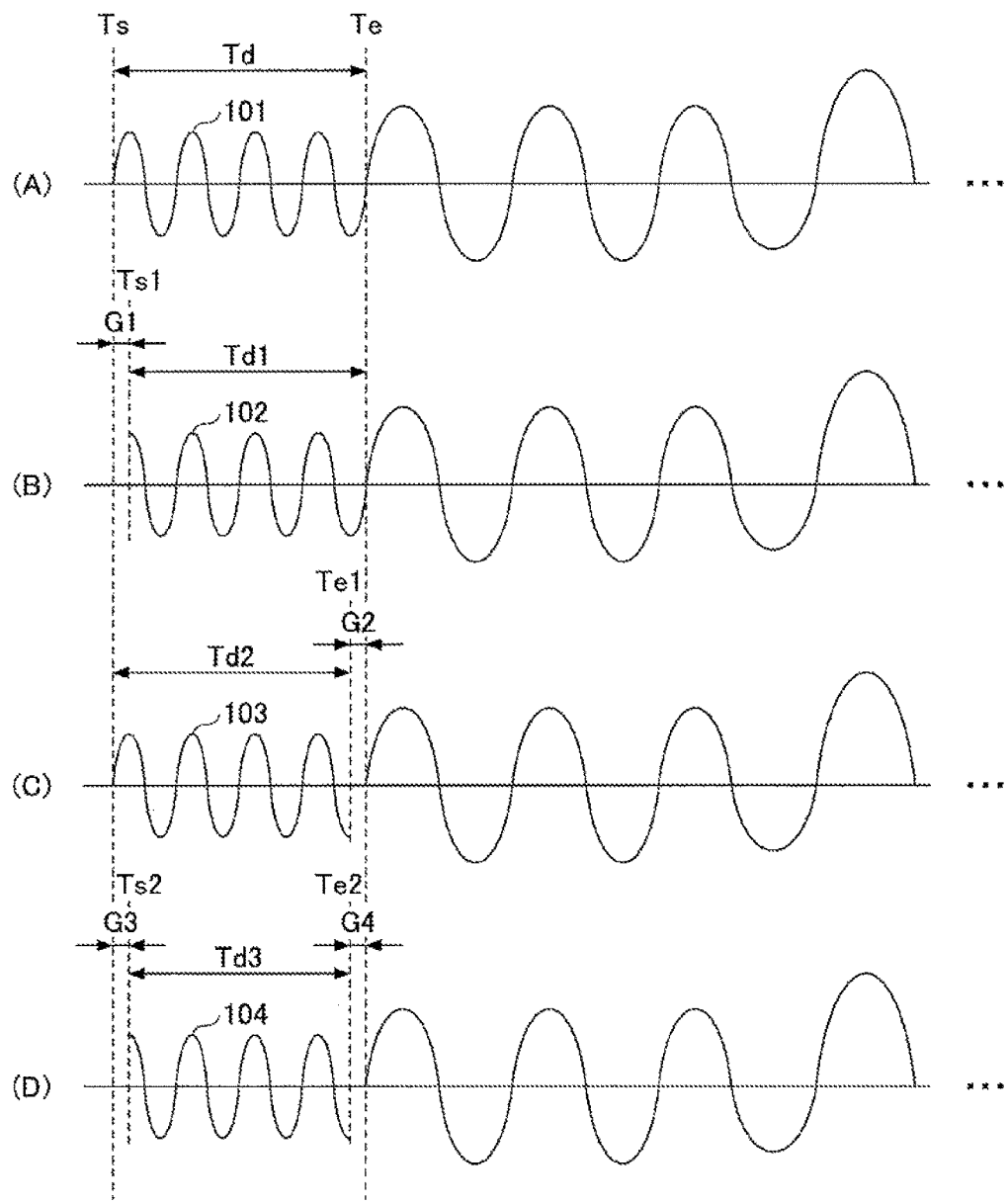
FIG. 10 is a drawing illustrating exemplary synchronization signals.

Next, an exemplary process performed by the aligner 428 is described with reference to FIG. 10. FIG. 10 is a drawing illustrating exemplary synchronization signals. FIG. 10 (A) indicates a synchronization signal 101 with a predetermined length Td sec, and FIG. 10 (B), (C), and (B) indicate synchronization signals 102, 103, and 104 whose lengths are shorter than Td sec.

The period (length) of the synchronization signal 101 of FIG. 10 (A) between a time Ts when the synchronization signal 101 starts and a time Te when the synchronization signal 101 ends is Td sec.

The period (length) of the synchronization signal 102 of FIG. 10 (B) between a time Ts1 when the synchronization signal 102 starts and the time Te when the synchronization signal 102 ends is Td1 sec that is shorter than Td sec. This indicates that the synchronization signal 102 is not received during a period G1 from the time Ts to the time Ts1.

The period (length) of the synchronization signal 103 of FIG. 10 (C) between the time Ts when the synchronization signal 103 starts and a time Te1 when the synchronization signal 103 ends is Td2 sec that is shorter than Td sec. This indicates that the synchronization signal 103 is not received during a period G2 from the time Te1 to the time Te.

The period (length) of the synchronization signal 104 of FIG. 10 (D) between a time Ts2 when the synchronization signal 104 starts and a time Te2 when the synchronization signal 104 ends is Td3 sec that is shorter than Td sec. This indicates that the synchronization signal 104 is not received during a period G3 from the time Ts to the time Ts2 and a period G4 between the time Te2 and the time Te.

When the synchronization signal of the Mth header-attached modulated signal is the synchronization signal 101 having a predetermined length (Td sec), the aligner 428 sets the start of the synchronization signal 101 as a reference position at which the Mth header-attached modulated signal is aligned with another header-attached modulated signal.

When the synchronization signal of the Mth header-attached modulated signal is the synchronization signal 102 having a length different from the predetermined length (Td sec), the aligner 428 determines whether the header information signal immediately follows the synchronization signal 102. In the case of FIG. 10 (B), the header information signal starts at the time Te when the synchronization signal 102 ends. Accordingly, the aligner 428 sets the end of the synchronization signal 102 as a reference position at which the Mth header-attached modulated signal is aligned with another header-attached modulated signal.

When the synchronization signal of the Mth header-attached modulated signal is the synchronization signal 103 having a length different from the predetermined length (Td sec), the aligner 428 determines whether the header information signal immediately follows the synchronization signal 103.

In the case of FIG. 10 (C), the period G2 is present immediately after the synchronization signal 103 and the header information signal does not immediately follow the synchronization signal 103.

In this case, the aligner 428 cannot determine whether the synchronization signal 103 is an independent signal or a part of a header-attached modulated signal. Therefore, the demodulation processor 420 excludes the header-attached modulated signal including the synchronization signal 103 from being used in the signal generation process.

Similarly, the synchronization signal 104 has a length different from the predetermined length (Td sec) and is followed by the period G4 where no signal is received. Accordingly, the aligner 428 cannot determine whether the synchronization signal 104 is an 20 independent signal or a part of a header-attached modulated signal, and excludes the header-attached modulated signal including the synchronization signal 104 from being used in the signal generation process.

Thus, in the present embodiment, when there is an error (or irregularity) in a synchronization signal that characterizes a header-attached modulated signal, whether the header-attached modulated signal is used in the signal generation process is determined based on the type of the error.

Next, an exemplary process performed by the value selector 429 is described with reference to FIGS. 11A and 11B.

Figure 11A:
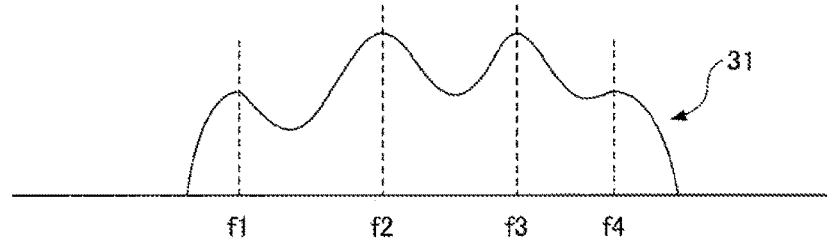
FIG. 11A is a drawing illustrating an exemplary header-attached modulated signals.
Figure 11B:
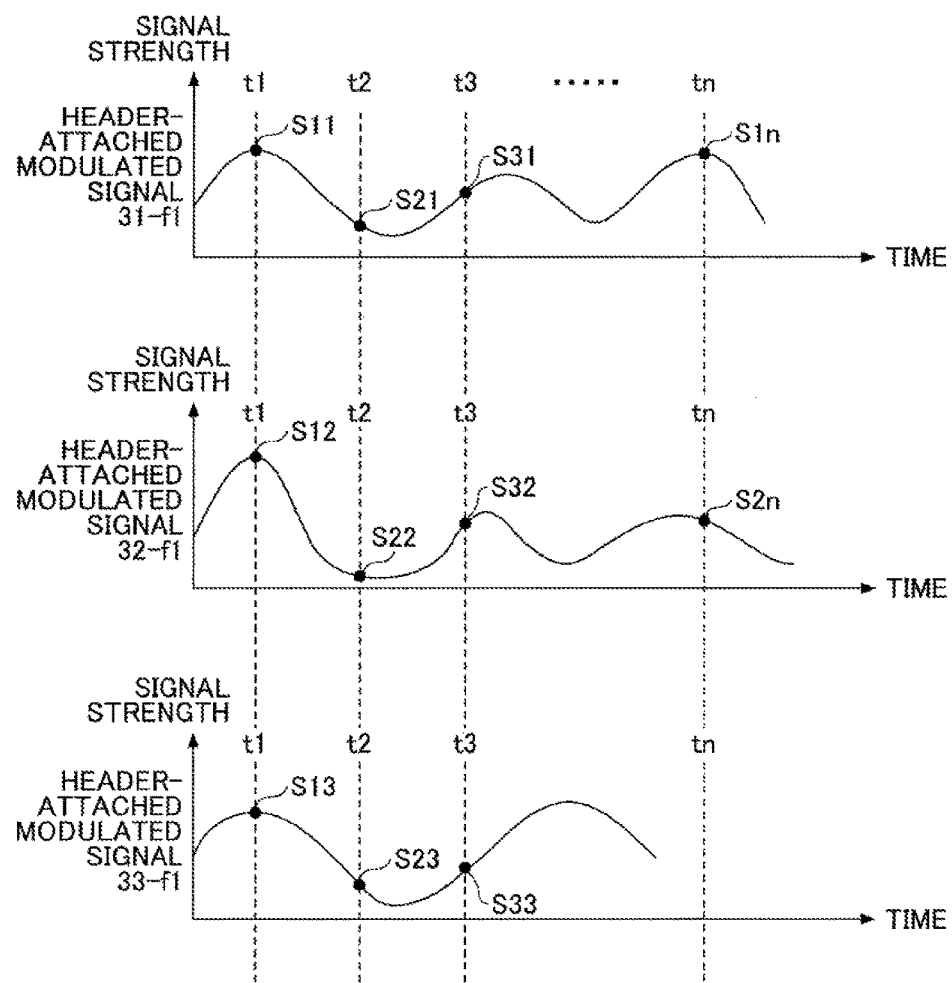
FIG. 11B is a drawing used to describe an exemplary method of determining target signal strength values.

FIG. 11A is a drawing illustrating an example of the header-attached modulated signal 31 received by 10 the modulation server 400 from the receiving device 300-1, and FIG. 11B is a drawing used to describe an exemplary method of determining target signal strength values.

In the example of FIG. 11A, the header-attached modulated signal 31 is generated by modulating four carrier waves having frequencies f1, f2, f3, and f4, and attaching a synchronization signal and a header information signal to each of the modulated carrier waves. In other words, the header-attached modulated signal 31 includes a header-attached modulated signal 31-f1 with the frequency f1, a header-attached modulated signal 31-f2 with the frequency f2, a header-attached modulated signal 31-f3 with the frequency f3, and a header-attached modulated signal 31-f4 with the frequency f4.

In the present embodiment, each of the header-attached modulated signal 32 received from the receiving device 300-2 and the header-attached modulated signal 33 received from the receiving device 300-3 also includes header-attached modulated signals with the frequencies f1, f2, f3, and f4.

In the example of FIG. 11B, it is assumed that a demodulation target signal is generated using the header-attached modulated signal 31-f1, the header-attached modulated signal 32-f1, and the header-attached modulated signal 33-f1 that have the frequency The value selector 429 aligns the three header-attached modulated signals with each other, and compares the signal strength values of the header-attached modulated signals at each predetermined time point.

In the present embodiment, time points are defined by a time scale that has a resolution corresponding to the modulation rate of header-attached modulated signals (or a modulated signal). For example, when each header-attached modulated signal has a modulation rate of 10 times per second, time points are defined by a time scale with a resolution of 0.1 sec. That is, the signal strength values of the header-attached modulated signals are compared with each other at a predetermined interval of 0.1 sec.

In FIG. 11B, at a time (time point) t1, the signal strength value of the header-attached modulated signal 31-f1 is S11, the signal strength value of the header-attached modulated signal 32-f1 is S12, and the signal strength value of the header-attached modulated signal 33-f1 is S13.

In this case, the value selector 429 compares the signal strength values S11, S12, and S13 and determines whether the signal strength values S11, S12, and S13 are close to each other.

More specifically, the value selector 429 compares the signal strength values S11 and S12 to determine whether the difference between the signal strength values S11 and S12 is within a predetermined range, compares the signal strength values S11 and S13 to determine whether the difference between the signal strength values S11 and S13 is within the predetermined range, and then compares the signal strength values S12 and S13 to determine whether the difference between the signal strength values S12 and S13 is within the predetermined range.

When all of the differences are within the predetermined range, the value selector 429 selects the largest one of the signal strength values S11, S12, and S13 as a target signal strength value at the frequency f1 and the time t1.

When one or more of the differences are out of the predetermined range, the value selector 429 may be configured to compare only a combination of signal strength values whose difference is within the predetermined range, and select a greater one of the signal strength values as a target signal strength value at the frequency f1 and the time t1.

Also, the value selector 429 may be configured to obtain an average of signal strength values whose difference is within the predetermined range, and use the obtained average as a target signal strength value at the frequency f1 and the time t1.

The value selector 429 determines a target signal strength value at a time (time point) t2 based on signal strength values S21, S22, and S23, determines a target signal strength value at a time (time point) t3 based on signal strength values S31, S32, and S33, and determines target signal strength values at the subsequent time points in a similar manner.

In the example of FIG. 11B, only two signal strength values S1n and S2n of the header-attached modulated signals 31-f1 and 32-f1 are available at a time tn. In such a case, the value selector 429 may be configured to use a greater one of the signal strength values S1n and S2n as a target signal strength value at the frequency f1 and the time tn.

The value selector 429 retains the target signal strength values determined as described above for the respective time points as a demodulation target signal of the corresponding frequency.

For example, the value selector 429 retains, as a demodulation target signal of the frequency f1, the signal strength value S11 at the time t1, the signal strength value S22 at the time t2, the signal strength value S31 at the time t3, . . . and the signal strength value S1n at the time tn.

The value selector 429 performs a similar process on header-attached modulated signals with the frequencies f2, f3, and f4 to generate demodulation target signals of the frequencies f2, f3, and f4.

As described above, according to the first embodiment, instead of demodulating header-attached modulated signals received from multiple receiving devices 300 and assumed to include the same modulated signal, a modulation target signal is generated from the header-attached modulated signals and then demodulated. Thus, the first embodiment makes it possible to generate a demodulation, target signal with a waveform closer to the waveform of a modulated signal, and makes it possible to improve the accuracy of information obtained from a radio signal.

<Second Embodiment>

A second embodiment is described below with reference to drawings. The second embodiment is different from the first embodiment in that the modulated signal generator 210 is provided in an information processing apparatus connected to a communication apparatus. Accordingly, the same reference numbers as those assigned to components in the first embodiment are assigned to the same or similar components in the second embodiment, and descriptions of those components are omitted.

Figure 12:
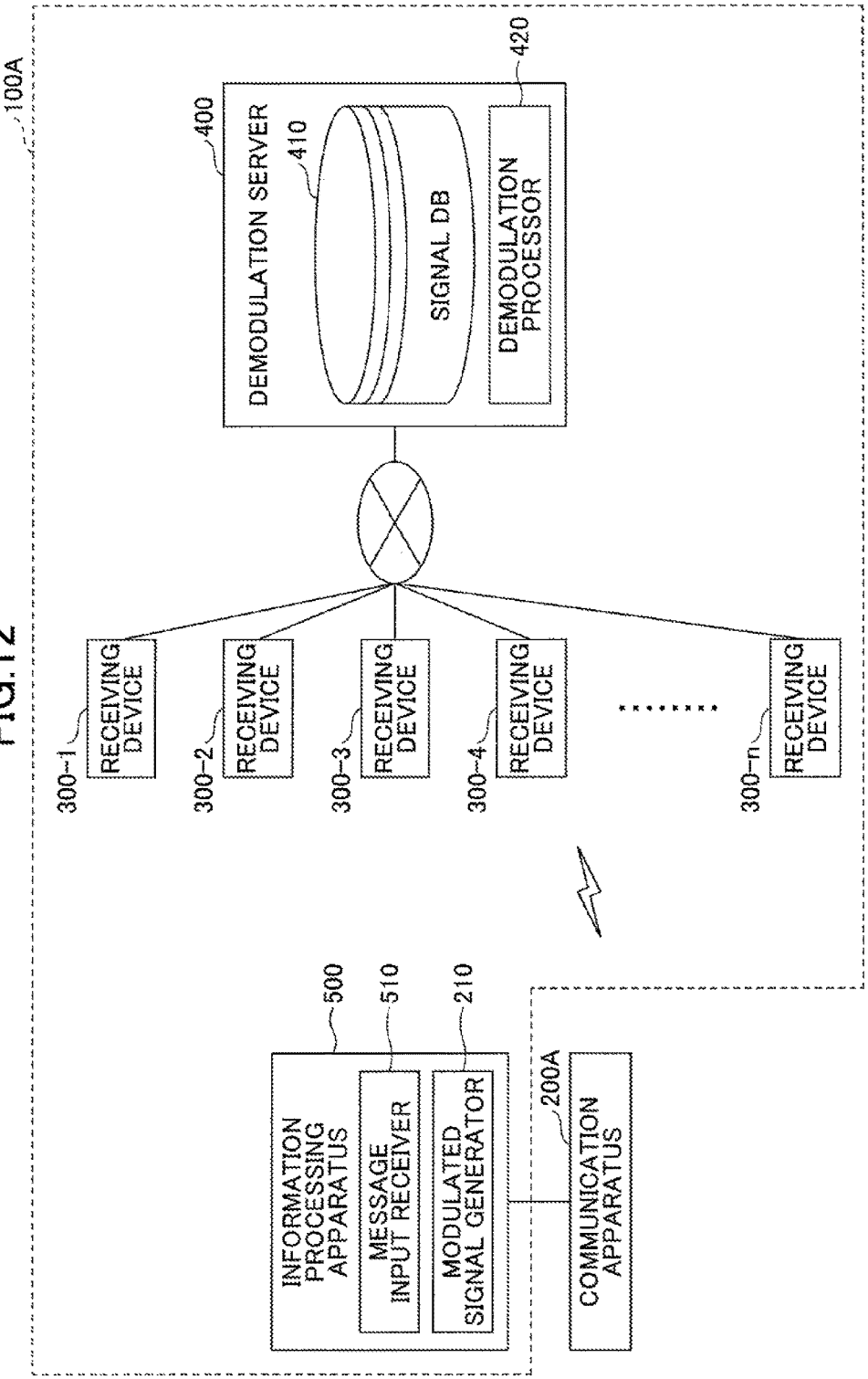
FIG. 12 is a drawing illustrating an exemplary configuration of a communication system according to a second embodiment.

FIG. 12 is a drawing illustrating an exemplary configuration of a communication system 100A according to the second embodiment. The communication system 100A may include an information processing apparatus 500, the receiving devices 300, and the demodulation server 400.

The information processing apparatus 500 may include a message input receiver 510 and the modulated signal generator 210, and is connected to a communication apparatus 200A. The communication apparatus 200A is a simple radio communication apparatus including a function to transmit a modulated signal.

The information processing apparatus 500 may be implemented by, for example, a general-purpose computer. In the second embodiment, a processor of the information processing apparatus 500 executes a program to implement the modulated signal generator 210 that generates a modulated signal by attaching a synchronization signal with the same waveform as the synchronization signal data 442 to transmission information.

The message input receiver 510 of the information processing apparatus 500 receives a message input as transmission information. In the second embodiment, because a modulated signal is generated by the information processing apparatus 500, a message to be transmitted may be any type of information such as image data, video data, or a document file that the information processing apparatus 500 can handle.

In the second embodiment, the information processing apparatus 500 outputs the generated modulated signal to the communication apparatus 200A, and the communication apparatus 200A transmits the modulated signal received from the information processing apparatus 500.

Thus, according to the second embodiment, the communication apparatus 200A may include only a function to receive and transmit a modulated signal. This in turn makes it possible to use various types of information as messages.

The above embodiments may be implemented as functional components of an apparatus, a computer-implemented method, and a non-transitory computer-readable storage medium storing a program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a program that causes a computer to execute a process comprising:
   receiving radio signals from base stations, the radio signals being generated by the base stations based on a modulated signal received at the base stations;
   determining one or more reception target signals in the received radio signals, the reception target signals having a predetermined target frequency and being modulated according to a predetermined target modulation scheme;
   aligning the reception target signals with each other;
   generating a demodulation target signal based on the aligned reception target signals; and
   demodulating the generated demodulation target signal,
   wherein among the received radio signals having the predetermined target frequency and being modulated according to the predetermined target modulation scheme, one or more radio signals that include a characteristic signal are determined as the reception target signals, and radio signals that do not include the characteristic signal are excluded from the reception target signals.

2. The non-transitory computer-readable storage medium as claimed in claim 1, wherein one or more of the reception target signals that have an error in the characteristic signal are excluded from the aligning.

3. The non-transitory computer-readable storage medium as claimed in claim 1, wherein when a reception target signal of the reception target signals has an error in the characteristic signal, a portion of the reception target signal where the error is not present is aligned with the other reception target signals.

4. The non-transitory computer-readable storage medium as claimed in claim 1, wherein the characteristic signal includes
   a synchronization signal that has a predetermined synchronization frequency and a predetermined period; and
   a header information signal that includes information indicating a position of a corresponding one of the base stations, information indicating a date and time when the modulated signal is received at the corresponding one of the base stations, and information indicating the predetermined target frequency.

5. The non-transitory computer-readable storage medium as claimed in claim 4, the process further comprising:
   comparing the synchronization signal in each of the reception target signals with synchronization signal waveform data stored in a storage to determine a synchronization signal matching degree,
   wherein one or more of the reception target signals whose synchronization signal matching degree is greater than or equal to a predetermined threshold are selected as alignment target signals to be aligned in the aligning.

6. The non-transitory computer-readable storage medium as claimed in claim 5, the process further comprising:
   comparing the header information signal in each of the reception target signals with waveform data stored in the storage and representing a portion of the header information signal to determine a header information matching degree,
   wherein one or more of the reception target signals whose header information matching degree is greater than or equal to a predetermined threshold are also selected as the alignment target signals.

7. The non-transitory computer-readable storage medium as claimed in claim 6, the process further comprising:
   when the synchronization signal in a reception target signal of the reception target signals has the predetermined period, setting a reference position of the reception target signal used for the aligning at a start of the synchronization signal;
   when the synchronization signal in the reception target signal is shorter than the predetermined period and the synchronization signal is immediately followed by the header information signal, setting an end of the synchronization signal as the reference position; and
   when the synchronization signal in the reception target signal is shorter than the predetermined period and the synchronization signal is not immediately followed by the header information signal, excluding the reception target signal from the aligning.

8. The non-transitory computer-readable storage medium as claimed in claim 1, wherein the generating includes
   comparing signal strength values of the aligned reception target signals at each of predetermined time points;
   determining target signal strength values at the respective predetermined time points based on a result of the comparison; and
   generating the demodulation target signal based on the target signal strength values.

9. The non-transitory computer-readable storage medium as claimed in claim 8, wherein a largest one of the signal strength values of the aligned reception target signals is determined as a target signal strength value at each of the predetermined time points.

10. The non-transitory computer-readable storage medium as claimed in claim 8, wherein at each of the predetermined time points, an average of a combination of the signal strength values whose difference is within a predetermine range is determined as a target signal strength value.

11. A computer-implemented method comprising:
receiving radio signals from base stations, the radio signals being generated by the base stations based on a modulated signal received at the base stations;
determining one or more reception target signals in the received radio signals, the reception target signals having a predetermined target frequency and being modulated according to a predetermined target modulation scheme;
aligning the reception target signals with each other;
generating a demodulation target signal based on the aligned reception target signals; and
demodulating the generated demodulation target signal,
wherein among the received radio signals having the predetermined target frequency and being modulated according to the predetermined target modulation scheme, one or more radio signals that include a characteristic signal are determined as the reception target signals, and radio signals that do not include the characteristic signal are excluded from the reception target signals.

12. A demodulation apparatus comprising:
a processor configured to execute a process including
receiving radio signals from base stations, the radio signals being generated by the base stations based on a modulated signal received at the base stations;
determining one or more reception target signals in the received radio signals, the reception target signals having a predetermined target frequency and being modulated according to a predetermined target modulation scheme;
aligning the reception target signals with each other;
generating a demodulation target signal based on the aligned reception target signals; and
demodulating the generated demodulation target signal,
wherein among the received radio signals having the predetermined target frequency and being modulated according to the predetermined target modulation scheme, one or more radio signals that include a characteristic signal are determined as the reception target signals, and radio signals that do not include the characteristic signal are excluded from the reception target signals.

* * * * *